(12) United States Patent
Rogers

(10) Patent No.: US 8,101,905 B2
(45) Date of Patent: Jan. 24, 2012

(54) INFRARED SENSOR CALIBRATION SYSTEM AND METHOD

(75) Inventor: Eldon Rogers, Auburn, WA (US)

(73) Assignee: The Boeing Company, Chicago, IL (US)

( * ) Notice: Subject to any disclaimer, the term of this patent is extended or adjusted under 35 U.S.C. 154(b) by 798 days.

(21) Appl. No.: 12/203,915

(22) Filed: Sep. 4, 2008

(65) Prior Publication Data

US 2010/0051794 A1    Mar. 4, 2010

(51) Int. Cl.
G01D 18/00 (2006.01)
G01J 5/02 (2006.01)

(52) U.S. Cl. ................ 250/252.1; 250/339.09

(58) Field of Classification Search ........... 250/252.1, 250/393.09, 338.1, 340, 504 R
See application file for complete search history.

(56) References Cited

U.S. PATENT DOCUMENTS 6,921,898 B1 * 7/2005 Chen .............................. 250/340
7,439,510 B2 * 10/2008 Bevan et al. .............. 250/339.14

OTHER PUBLICATIONS

Special Sciences, Inc. "MODTRAN," available at <http://www.modtran.org/user/index.html>, last visited Nov. 20, 2011.
Berk et al. "MODTRAN4_USER_MANUAL" Jun. 1999.
FLIR System, "The Phoenix DTS", Year 2005.
Cromwell, RTools: Radiometric Software Toolkit, Aug. 18, 2005.

* cited by examiner

Primary Examiner — David Porta
Assistant Examiner — Faye Boosalis
(74) Attorney, Agent, or Firm — Novatech IP Law; Sean O'Neill; Dennis Plank

(57) ABSTRACT

A calibration system for an infrared imaging system includes an infrared sensor having a sensor model for imaging a target having a target spectral signature. The infrared imaging system includes an atmospheric model having atmospheric spectral values. The calibration system comprises a blackbody calibration source having a calibration source spectral signature and a computer for receiving the sensor model, the target spectral signature, the calibration source spectral signature and the atmospheric spectral values. The computer predicts a target spectral signature propagation at the infrared sensor and matches the target spectral signature propagation with the calibration source spectral signature propagation to determine a blackbody calibration source temperature for radiometric calibration of the infrared sensor.

23 Claims, 17 Drawing Sheets

INFRARED SENSOR CALIBRATION SYSTEM AND METHOD

CROSS-REFERENCE TO RELATED APPLICATIONS (Not Applicable)

STATEMENT RE: FEDERALLY SPONSORED RESEARCH/DEVELOPMENT (Not Applicable)

BACKGROUND

The present invention relates generally to thermal imaging systems and, more particularly, to an infrared sensor calibration system for determining exposure settings, non-uniformity correction temperatures and calibration temperatures to use at close range for measurement of high temperature targets at long range.

Infrared (IR) sensor systems are commonly used to generate thermal images of a scene being viewed. For example, IR sensor systems may be used in long-range detection and tracking of various targets including missiles and aircraft. The IR sensor produces a radiometric IR signature which generally represents the amount of infrared energy emitted by the tracked object in comparison to objects in the background.

For imaging an object, it is necessary that the range of temperatures emitted by the tracked object fall within the dynamic range of the IR sensor system which may comprise an IR camera and/or spectro-radiometer. Prior to imaging, it is necessary to calibrate for the specifications of a given IR sensor, a given target spectral signature and a given atmospheric model to ensure that there is no instrument saturation during long-range target imaging.

Prior art methods of calibrating IR sensor settings are typically performed using a relatively slow, iterative process. For example, a field test engineer may estimate average sensor response, average target signature and average path (i.e., atmospheric) transmittance. The test engineer may then calculate signal levels at the sensor estimating calibration temperatures and then manually iterating using spreadsheets and/or calculators to find sensor integration times. In another prior art method, a test engineer may pick integration times, guess the corresponding temperature ranges for the integration times and then calibrate the infrared sensor and hope that the image does not saturate.

Unfortunately, because prior art methods of calibrating IR sensor settings are performed manually, they may be subject to inaccuracies. For example, IR camera settings may be predicted using rules of thumb that may not be accurate for a given IR sensor, target spectral signature and atmospheric model. The result may be a poor estimation of the IR sensor settings.

Another drawback of prior art calibration methods is related to the relatively short period of time during which certain thermal imaging events occur. For example, during a missile launch, the thermal imaging may be on the order of a few minutes or less. Because of the short imaging window for missile launches and other short-duration events, there is insufficient time to adjust camera settings. Incorrect system settings may result in a risk of saturation and poor thermal signature measurement. Poor quality measurements as a result of incorrect IR sensor settings may necessitate the re-running of the thermal imaging which may be costly and time-consuming.

As can be seen, there exists a need in the art for an IR calibration system and method that is capable of predicting various IR sensor settings for use in radiometric signature measurement of long-range, high-temperature targets. Furthermore, there exists a need in the art for an IR calibration system and method that rapidly and accurately predicts such IR sensor settings for calibration purposes.

Additionally, there exists a need in the art for an IR calibration system and method which allows for setting radiometric measurement instrumentation to span target thermal energy. Finally, there exists a need in the art for an IR calibration system and method capable of reducing the risk of saturation and resulting bad signature measurements and time and cost associated therewith.

BRIEF SUMMARY

The above-described needs associated with IR calibration systems of the prior art are specifically addressed and alleviated by the various embodiments disclosed herein which provide a calibration system which may be implemented as a graphical software tool for calibrating an infrared imaging system for imaging a long-range (e.g., 100 km) target. The calibration system facilitates close-range (e.g., 10 m) calibrating of an infrared sensor using at least one and, more preferably, a plurality of blackbody calibration sources.

The calibration system is adapted to calibrate and configure an infrared sensor for measurement of the long-range target signature as an improvement over prior art calibration methods. Spectral data from a variety of databases are used in the calibration system in order to minimize saturation of the infrared sensor during radiometric measurements of the target. Such spectral data includes infrared sensor values from a database of sensor models, target spectral signatures selectable from a database of targets, calibration source spectral signatures of blackbody calibration sources, and atmospheric values (e.g., spectral transmittance, path radiance) such as from atmospheric models.

The calibration system predicts the target spectral signature propagation at the infrared sensor, matches the target spectral signature propagation with the calibration source spectral signature, and determines a blackbody calibration source temperature for radiometric calibration of the infrared sensor at close range for measurement of the target (e.g., missile, aircraft) at long range.

The calibration system may also output infrared sensor sensitivity settings such as integration time periods (e.g., exposure settings) of the detector elements of the focal plane array. Furthermore, the calibration system may also output a calibration temperature for non-uniformity correction of the detector elements such that the infrared sensor may produce high quality images of the target.

In addition, the calibration system may be used to simulate a blackbody target at long range. For example, if the temperatures of a long-range target (e.g., a missile) are unknown, the calibration system provides a means to determine the spectral signature of a simulated blackbody target propagated to the infrared sensor from the same distance as the target whose temperatures are unknown. The infrared sensor can then be calibrated to image the target with a reduced risk of saturation.

The technical effects of the disclosed embodiments include a reduction in the risk of instrument saturation during long-range target measurements. In addition, the disclosed embodiments result in a decrease in the amount of time required to determine the appropriate IR sensor settings (e.g., integration times, non-uniformity correction temperatures, and calibration temperatures) to be used for radiometric signature measurements. Furthermore, the calibration system represents an improvement in time, accuracy and dynamic range capability compared to manual, iterative, rough estimation processes of the prior art.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
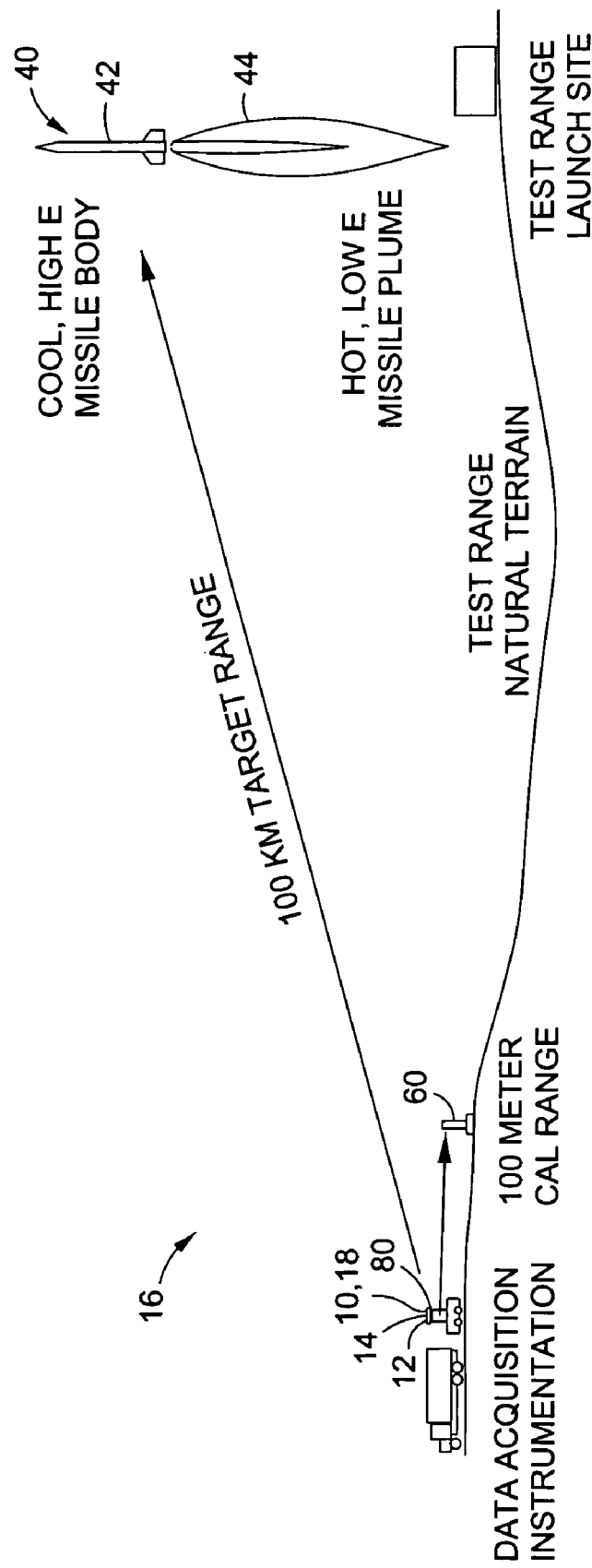
FIG. 1 is an illustration of an infrared imaging system for imaging a long-range target using a calibration system for calibrating an infrared sensor at close-range.

Referring now to the drawings wherein the showings are for purposes of illustrating preferred embodiments of the disclosure and not for purposes of limiting the same, shown in FIG. 1 is an illustration of an infrared imaging system 10 for imaging a long-range (e.g., 100 km) target 40 such as a missile using a calibration system 80 for close-range (e.g., 10 m) calibration of an infrared sensor 18 using at least one and, more preferably, a plurality of blackbody calibration sources 60.

In a broad sense, the disclosed calibration system 80 is adapted to calibrate and configure at least one infrared sensor 18 (e.g., camera, spectro-radiometer) to enable setting of the infrared sensor 18 for accurate measurement of the long-range target signature. The calibration system 80 uses spectral data from a broad range of components in order to minimize the risk of saturation of the infrared sensor 18 during radiometric measurements of the target 40. Such components include, but are not limited to, sensor models 20 of the infrared sensor 18, target spectral signature 46 typically modeled at the target 40, calibration source spectral signatures 62 of the blackbody calibration sources 60, and atmospheric values 52 such as from an atmospheric model 50.

The calibration system 80 may be implemented as a graphical software tool capable of predicting the target spectral signature propagation 48 at the infrared sensor, matching the target spectral signature propagation 48 (i.e., signature radiometric energy at the infrared sensor within the waveband) with the calibration source spectral signature 62, and determining a blackbody calibration source temperature 78 for radiometric calibration of the infrared sensor 18 at close range for measurement of the target 40 (e.g., missile, aircraft) at long range.

In addition, the calibration system 80 may be adapted to determine infrared sensor 18 sensitivity settings such as integration time periods 32 (e.g., exposure settings) of the detector elements 30 that make up the focal plane 28 array of the infrared sensor 18. Furthermore, the calibration system 80 is adapted to determine a calibration temperature for non-uniformity correction of the detector elements 30 in order to produce reliable and consistent images.

Additionally, the calibration system 80 may be used to simulate a blackbody target at long range for situations where the temperatures of a long-range target (e.g., a missile) are unknown, the calibration system 80 provides a means to determine the spectral signature of a simulated blackbody target that may be propagated to the infrared sensor 18 from a similar or approximated distance as the target 40 whose temperatures are unknown. The infrared sensor 18 can then determine the blackbody calibration source temperature 78 for radiometric calibration of the infrared sensor 18 with a reduced risk of saturation when imaging a target 40.

Referring to FIG. 1, data acquisition instrumentation 12 are shown positioned at a test range 16 site at a distance (e.g., 100 km) from an exemplary target 40 which is illustrated as a missile having a missile body 42 of relatively low temperature and high emissivity and a plume 44 of relatively high temperature and low emissivity. The data acquisition instrumentation 12 may comprise one or more of the infrared sensors 18 and may optionally include a spectro-radiometer 38, a rangefinder 34 such as a laser rangefinder for determining the distance of the target 40 from the infrared sensor 18, a video camera 36 for visual tracking of the target 40, and various other instruments.

Also shown is at least one and, more preferably, a plurality of blackbody calibration sources 60 mounted a predetermined distance away from the infrared sensor 18 such as at the 100 meter range illustrated although distances may be on the order of 10 meters. In one embodiment, the blackbody calibration sources 60 may be mounted on a vehicle at the test range 16 with the infrared sensor 18 and other data acquisition instrumentation 12 being mounted on a tracker 14 disposed in spaced relation to the vehicle. Each of the blackbody calibration sources 60 may be configured to span different temperature ranges in order to reduce calibration time.

Figure 2:
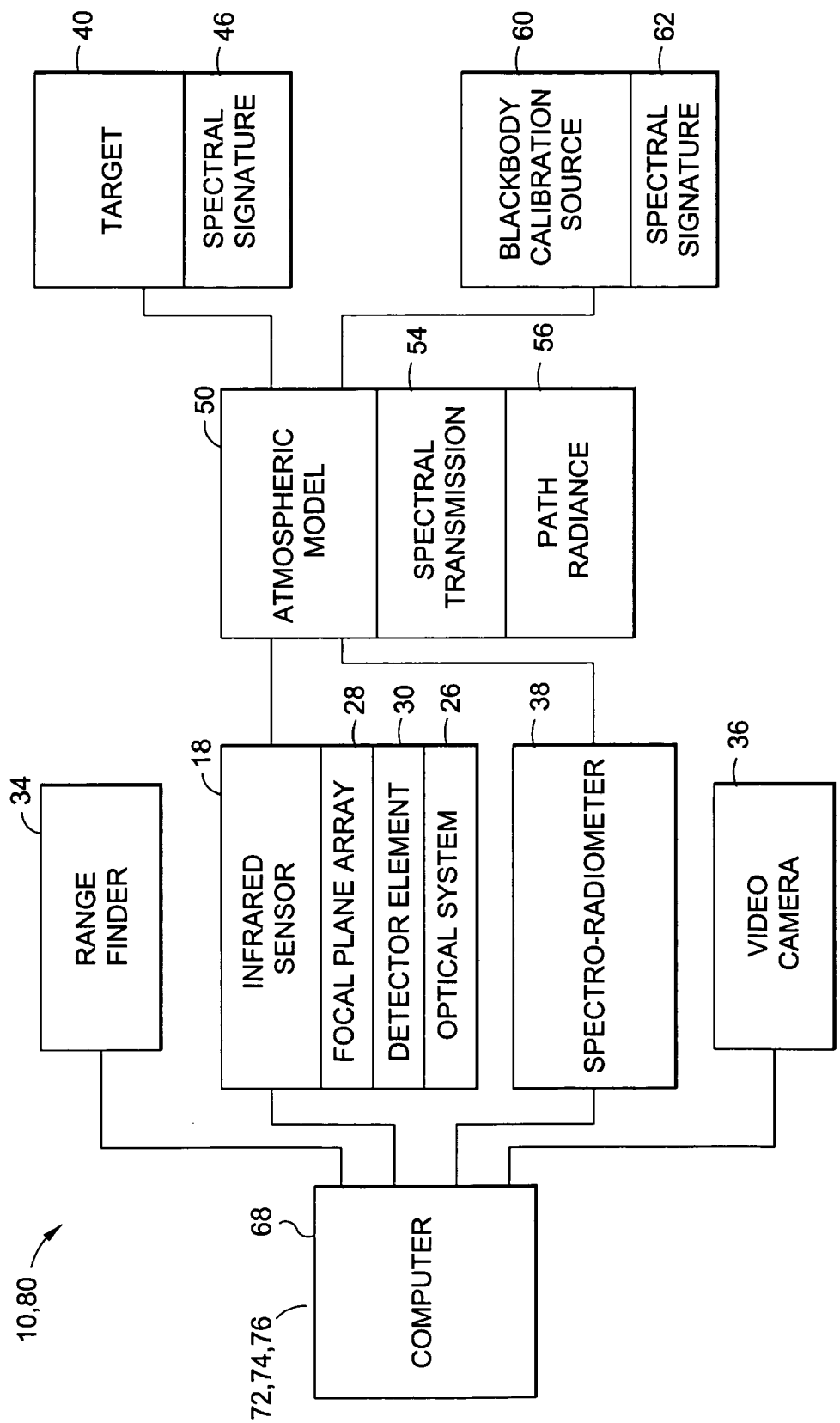
FIG. 2 is a block diagram of a computer, an infrared sensor, an atmospheric model, a target and a blackbody calibration source as may be used in the calibration system for calibrating the infrared sensor.

Referring to FIG. 2, shown is a block diagram of a calibration system 80 including the infrared sensor 18, the atmospheric model 50, the target 40 and the blackbody calibration source 60 which may each be communicatively coupled to at least one computer 68. The computer 68 may comprise multiple synchronized computers cooperating to receive input on the infrared sensor model 20 including the optical system 26 and the focal plane 28 array of detector elements 30. In addition, the computer 68 may be adapted to receive input on the target spectral signature 46, the calibration source spectral signature 62 and atmospheric values 52 during calibration and configuration of the infrared imaging system 10.

Figure 3:
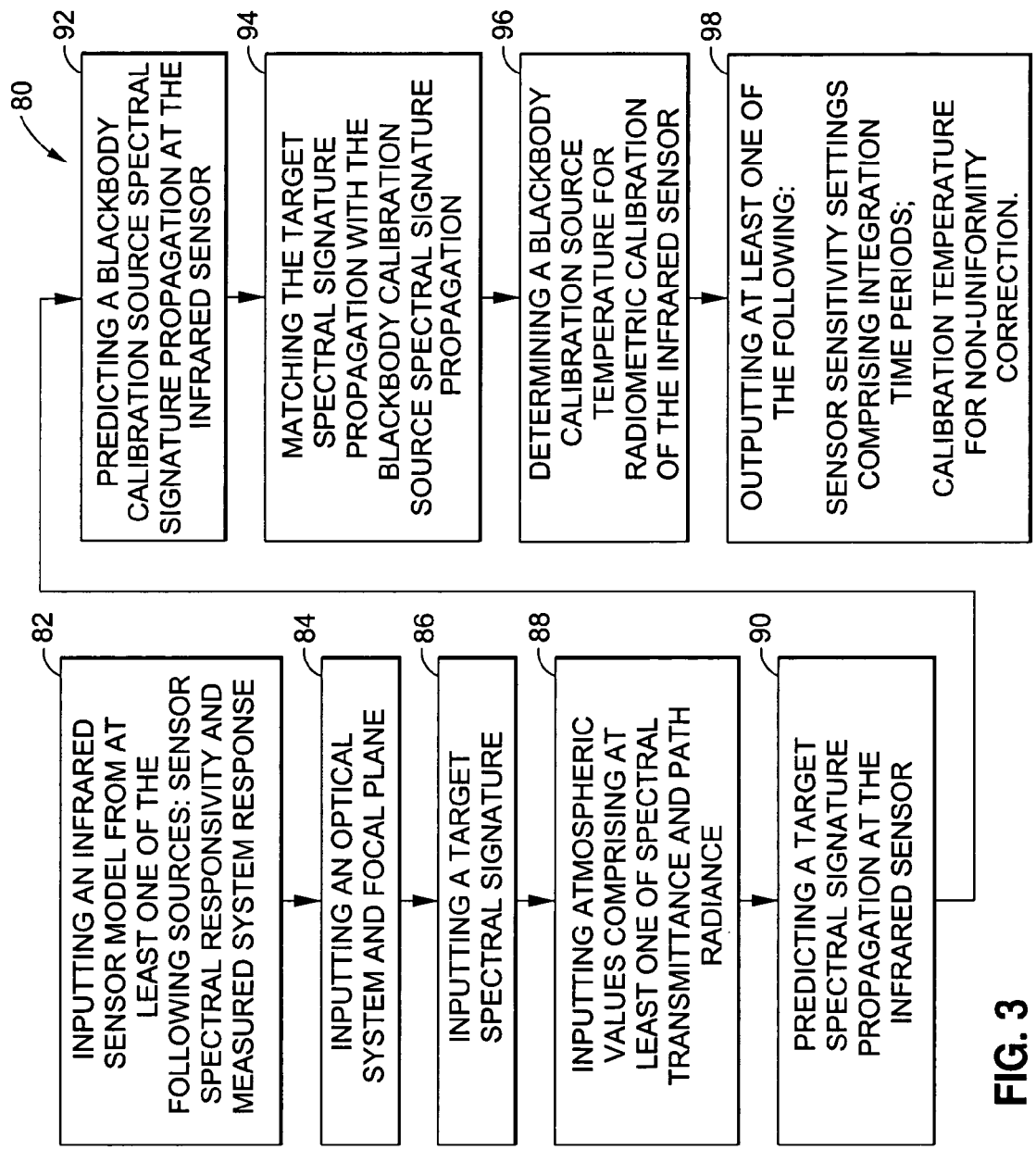
FIG. 3 is a flow diagram of an example of a method of calibrating the infrared sensor.

As shown in the flow chart of FIG. 3, following input of the sensor model 20 and target spectral signature 46, the computer 68 may predict the propagation of the target spectral signature 46 through the atmospheric path to the infrared sensor 18. The atmospheric path may comprise path radiance 56 and/or spectral transmittance 54 and may be provided by an atmospheric model 50 such as the moderate resolution atmospheric model 50 of the earth's atmosphere known as MODTRAN developed by the Air Force Research Laboratory and which may be embedded in the calibration system 80 software.

The blackbody calibration source spectral signature 62 may be measured at the infrared sensor 18 taking into account the atmospheric effects which may be negligible at short distances. The computer 68 may convert the long-range target spectral signature propagation 48 to a close-range calibration source equivalent by matching the radiance of the target spectral signature 46 with the radiance of the calibration source spectral signature 62 in order to determine the blackbody calibration source temperature 78 for radiometric calibration of the infrared sensor 18.

Figure 4:
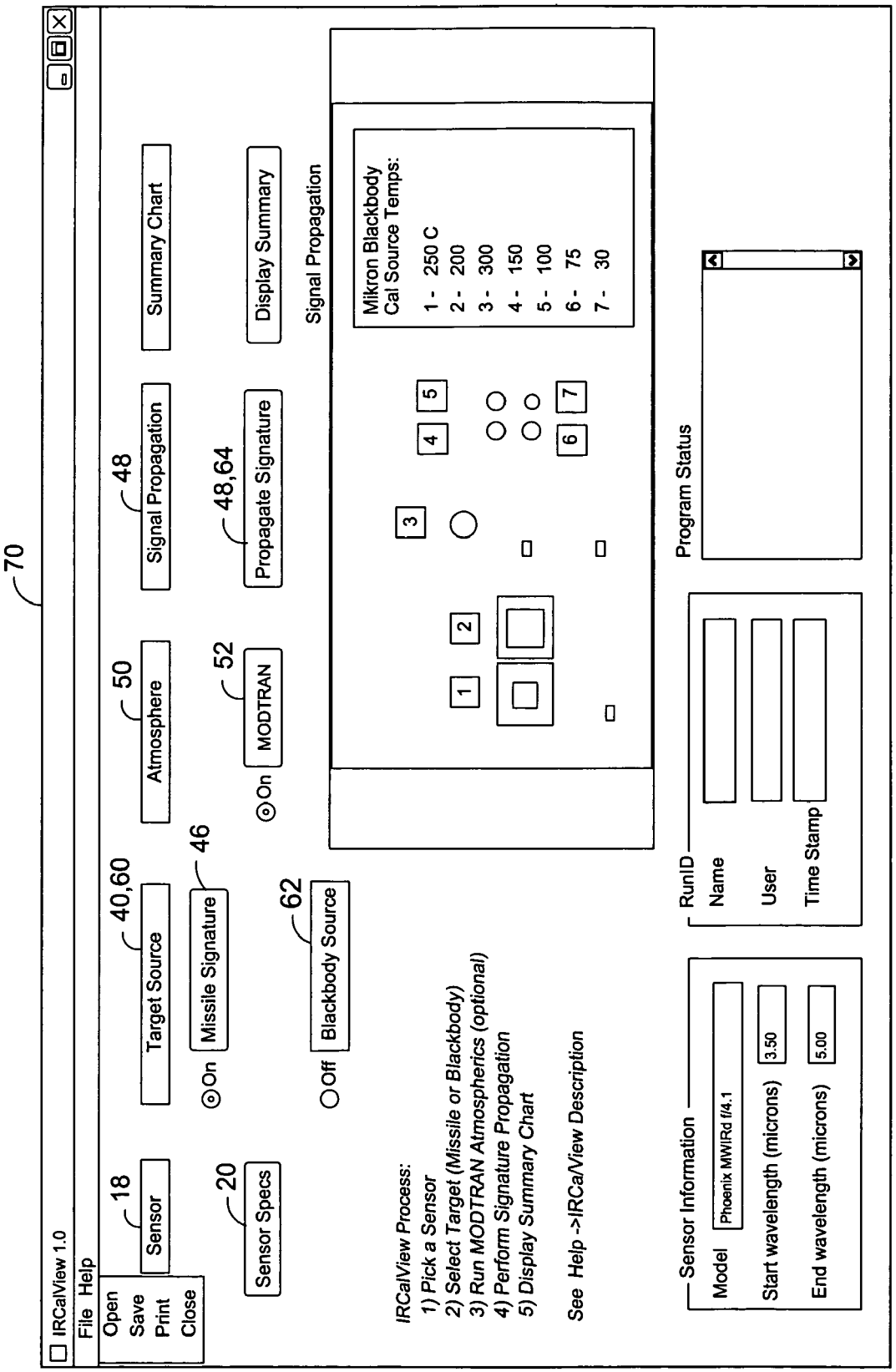
FIG. 4 is an illustration of an example of a graphical user interface (GUI) for selecting an infrared sensor model, a target spectral signature, a blackbody source spectral signature, an atmospheric model, a target spectral signature propagation at the infrared sensor, and a summary chart illustrating a matching of the target spectral signature propagation with the calibration source spectral signature.

Referring to FIG. 4, the calibration system 80 may include a database of various sensor models 20, target spectral signatures 46 for different targets 40, 60, calibration source spectral signatures 62 for various blackbody calibration sources 60, and atmospheric values 52 of an atmospheric model 50 which may be selected on a user interface such as the illustrated graphical user interface 70 (GUI) shown in FIG. 4. The exemplary GUI 70 of FIG. 4 allows the user to perform the propagation of the selected target 40 which may be the long-range target 40 (e.g., missile), the blackbody calibration source 60 at close-range or a blackbody simulated target at long-range. The GUI 70 of FIG. 4 provides the capability to activate an atmospheric model such as the MODTRAN executable program for generating path radiance 56 and spectral transmittance 54 contributions to propagation of the spectral signatures to the infrared sensor as described in greater detail below with reference to FIG. 9.

Figure 5:
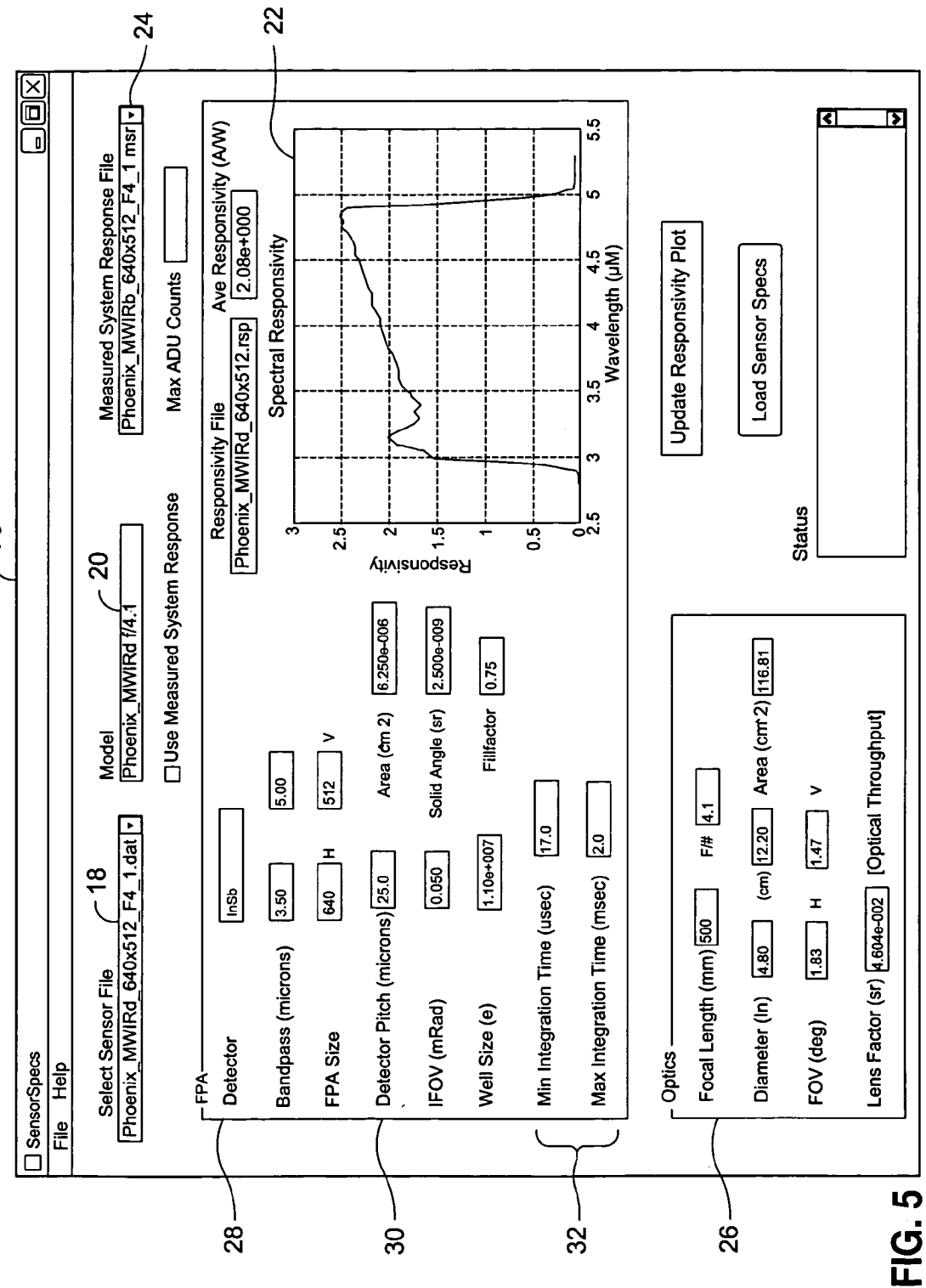
FIG. 5 is an illustration of an example of a GUI of the sensor model in an embodiment comprising sensor spectral responsivity.

Referring to FIG. 5, shown is an exemplary GUI 70 for sensor model 20 selection which may be a vendor-provided sensor spectral responsivity 22 of photon power as a function of wavelength. Alternatively, the sensor model 20 may be an empirically-developed measured sensor response 24 of the infrared sensor 18 which may be developed in a laboratory using blackbody calibration sources as described below with reference to FIG. 6.

As shown in FIG. 5, the sensor model 20 may include, but is not limited to, various parameters of an optical system 26 such as focal length, field of view and lens factor. The sensor model 20 may further include parameters regarding the focal plane 28 array including the detector type (e.g., InSb), desired bandpass (e.g., 3.50 to 5.00 microns of the MWIR band), focal plane 28 array size (e.g., 640×512), detector element parameters (e.g., detector pitch of 25.0 microns), and integration time period ranges (e.g., min. 17.0 μsec to 2.0 msec). The calibration system 80 software may be adapted to generate a chart of sensor spectral responsivity 22 as a function of wavelength and calculate the average inband (e.g., 3.5-5.0 microns) responsivity.

Figure 6:
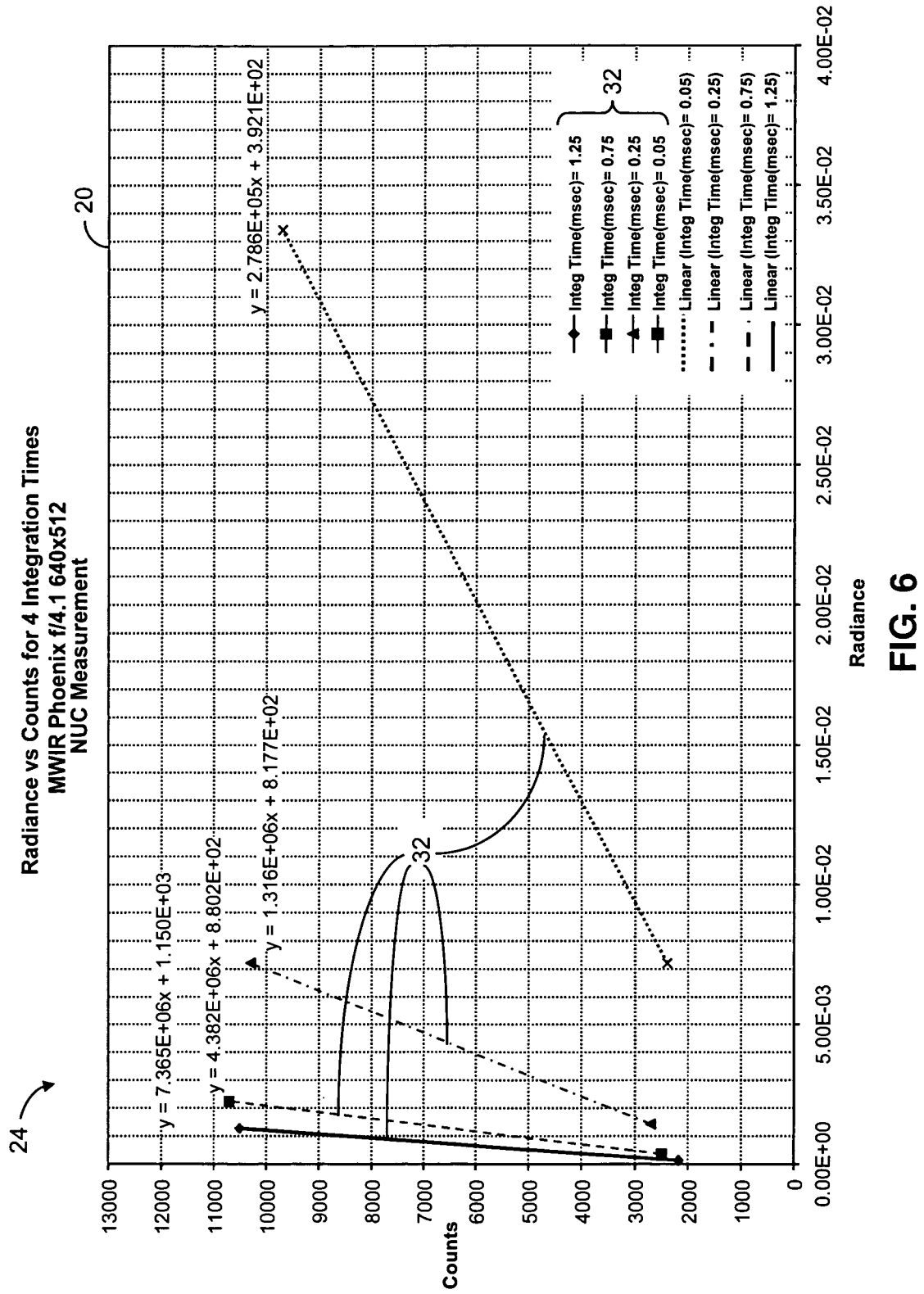
FIG. 6 is an illustration of an example of a GUI of the sensor model in an embodiment comprising a measured system response in terms of counts vs. radiance.

Referring to FIG. 6, the sensor model 20 may be provided as a measured sensor response 24 of the infrared sensor 18. For situations where the spectral responsivity of an infrared detector 18 is unknown, the response of the infrared sensor 18 may be developed in a laboratory to characterize the digital counts output from the infrared sensor 18 for a given blackbody calibration source 60 radiance input. As shown, the GUI 70 illustrated in FIG. 6 allows a user to set a saturation threshold (e.g., 13000 counts) and graphically illustrates the output in counts for each of four (4) integration time periods 32. The calibration system 80 may also facilitate presentation of the measured sensor response 24 of the infrared sensor 18 in tabular form.

Figure 7:
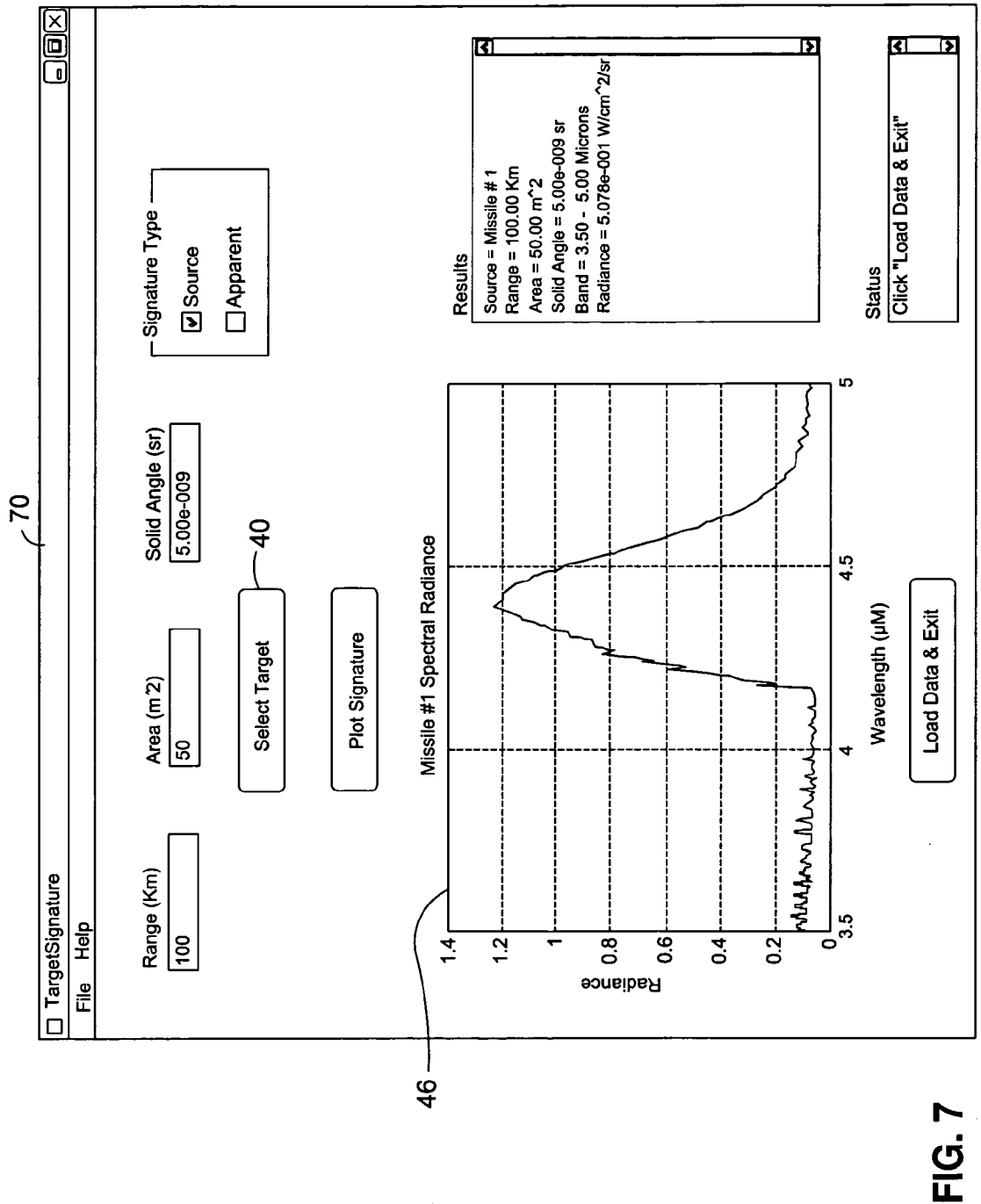
FIG. 7 is an illustration of an example of a GUI of the target spectral signature.

Referring to FIG. 7, shown is an exemplary graphical display of the target spectral signature 46 as modeled at the target. As can be seen, the calibration system 80 may include a database of targets 40 for which the target spectral signature 46 may be used in the calibration process. The GUI 70 may further provide the user with the option to enter data such as a range or distance (e.g., 100 km) to the target 40 from the infrared sensor 18. The target spectral signature 46 may be measured at the target 40 but is typically modeled and/or produced in combination with other simulation references. For example, for the missile illustrated in FIG. 1, the target spectral signature 46 illustrated in FIG. 7 may be the missile plume signature from a sounding rocket measurement and/or from simulation references.

Figure 8:
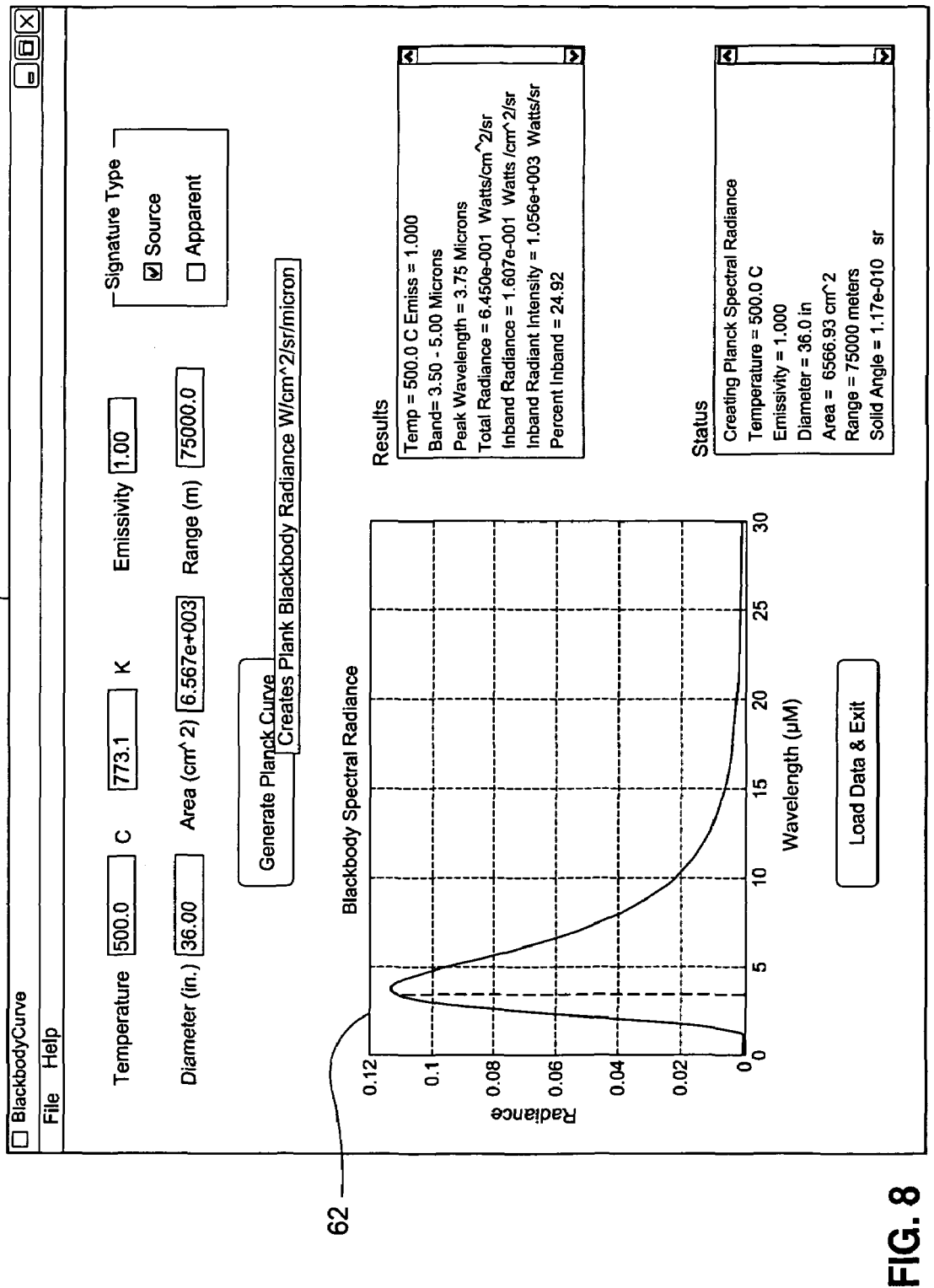
FIG. 8 is an illustration of an example of a GUI of the calibration source spectral signature or simulated blackbody target.

Referring to FIG. 8, shown is an exemplary graphical display of a spectral signature of a simulated blackbody target at 75000 meters (75 km) with corresponding temperature and physical parameters of the simulated blackbody target. As was earlier mentioned, the calibration system 80 may be used to simulate a blackbody target at long range for situations where the temperatures of a long-range target 40 (e.g., a missile) are unknown in order determine the spectral signature of the simulated blackbody target propagated from the same distance as the target 40. The infrared sensor 18 may determine the blackbody calibration source temperature 78 for radiometric calibration of the infrared sensor 18 with reduced risk of saturation. In FIG. 8, the simulated blackbody target spectral signature is plotted in terms of radiance per wavelength prior to propagation of the signature to the infrared sensor 18.

Figure 9:
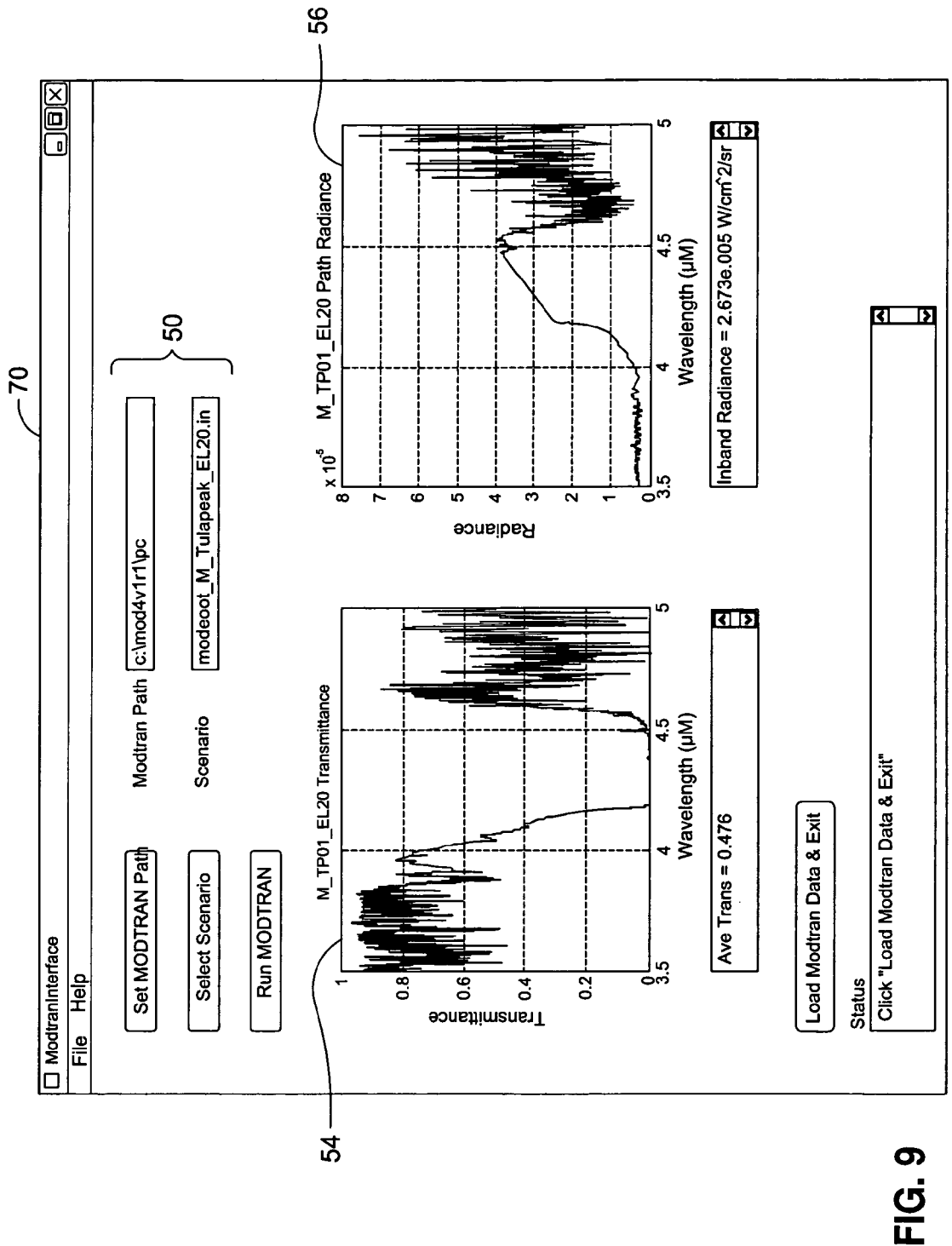
FIG. 9 is an illustration of an example of a GUI of the atmospheric model in an embodiment comprising spectral transmittance and path radiance.

Referring to FIG. 9, atmospheric values 52 of the atmospheric model 50 are graphically illustrated and may comprise line-of-sight path radiance 56 and spectral transmittance 54 of the earth's atmosphere. It can be seen that the spectral transmittance 54 includes a $CO_2$ absorption notch at 4.2-4.4 microns. As mentioned above, the atmospheric model 50 may be provided as the executable program module known as MODTRAN which may be embedded in the calibration system 80 software to generate the path radiance 56 and spectral transmittance 54 contributions. Alternatively, the atmospheric model 50 may be derived from atmospheric transmittance derivation calculations without MODTRAN. The GUI 70 illustrated in FIG. 9 allows a user to select the MODTRAN path and a scenario in order to generate the corresponding path radiance 56 and spectral transmittance 54.

Figure 10:
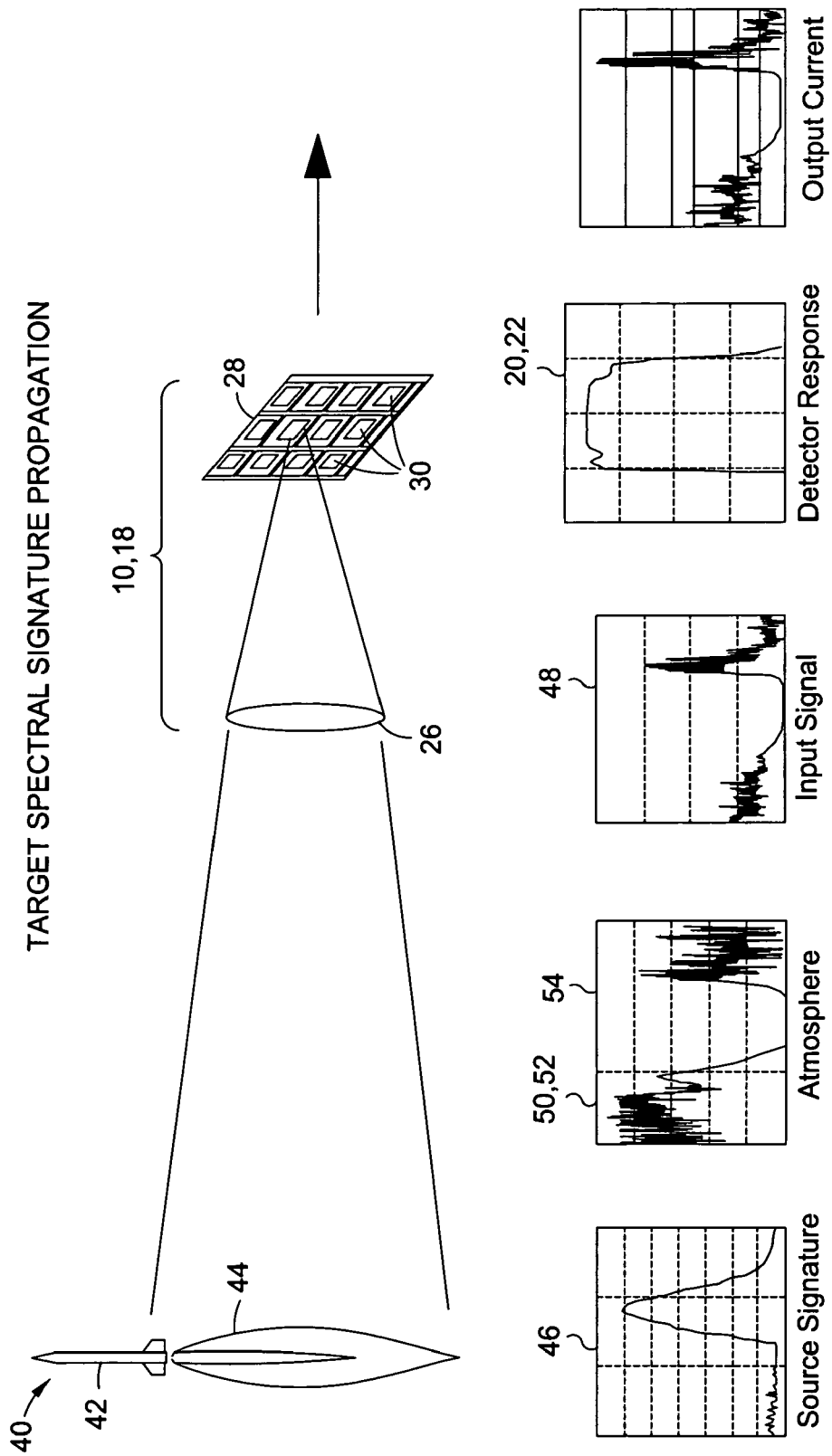
FIG. 10 is a schematic illustration of the target spectral signature propagation at the infrared sensor.

Referring to FIG. 10, shown is a schematic illustration of the sequence by which the target spectral signature 46 is propagated at the infrared sensor 18. The target model database includes a database of target spectral signatures 46 which are propagated through the selected atmospheric model 50 to factor the contributions of path radiance 56 and spectral transmittance 54.

As described above, the optical system 26 focuses the target spectral signature 46 on the focal plane 28 array of detector elements 30 each having a sensor spectral responsivity 22 as described above with reference to FIG. 5 or which may be provided as a measured sensor response 24 of the infrared sensor 18 as shown in FIG. 6. FIG. 10 further illustrates an output current signal from the infrared sensor 18 in response to the input signal or power (i.e., radiance) accounting for atmospheric contributions. The output current signal may be plotted as a function of wavelength.

Predicted Radiance at Infrared Sensor from Target Spectral Signature:

In an example of a resolved target 40 wherein the target scene covers more than one detector element or pixel of the focal plane 28 array, propagation of the target spectral signature 46 at the source may be determined by integration in the waveband using Equation 1 below:

$$\int_{\Delta\lambda}[L_{target}(\lambda)*T_{atmos\_100\,km}(\lambda)+L_{foreground\_100\,km}(\lambda)]d\lambda(W/cm^2/sr) \quad (Eqn\ 1)$$

wherein:

$\lambda$=wavelength $\Delta\lambda$=integration interval of waveband (e.g., 3.50-5.0 microns for MWIR—medium wavelength infrared)

$L_{target}$=spectral radiance of the target signature (e.g., missile, aircraft, etc.) typically provided by modeling codes and wherein the signature of the target 40 is measured at 0 range. Optionally, the calibration system 80 as disclosed herein may use an apparent target signature measured at a representative range.

$T_{atmos\_100\,km}$=spectral atmospheric transmittance for a target 40 at an exemplary range of 100 km may be provided by an atmospheric model 50 (e.g., the industry standard MODTRAN executable program) or which may be derived from atmospheric transmittance calculations.

$L_{foreground\_100\,km}$=spectral path radiance 56 in line-of-site between the target 40 and the infrared sensor using the MODTRAN atmospheric model 50 ($W/cm^2/sr/micron$).

W=watts $cm^2$=centimeter$^2$ sr=steradians micron=$10^{-6}$ meter

Figure 11:
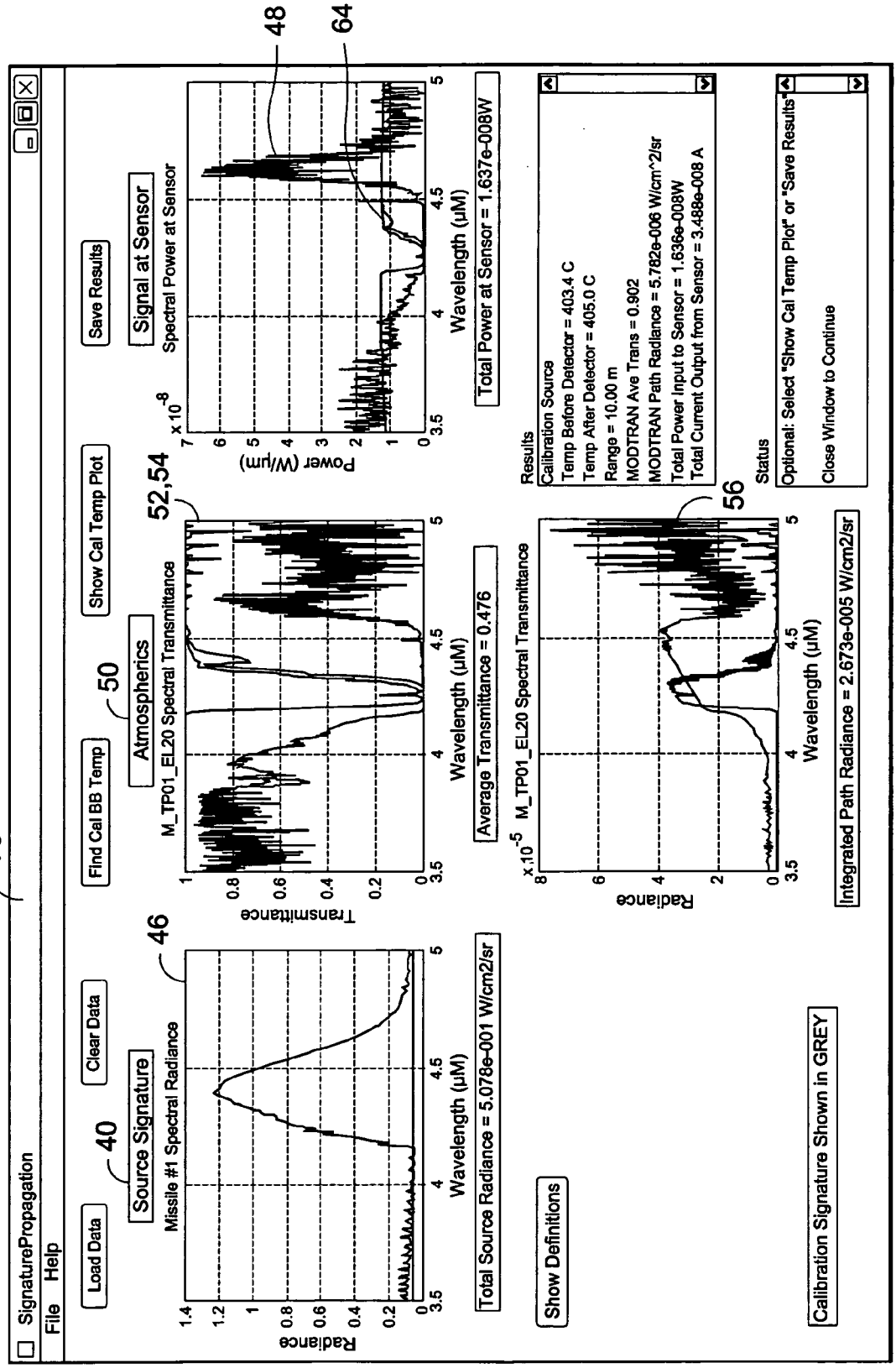
FIG. 11 is an exemplary GUI of the target spectral signature propagation.

Referring to FIG. 11, shown is graphical illustration of the propagation of the target spectral data mathematically determined above with Equation 1. As can be seen in FIG. 11, the calibration system 80 optionally indicates the in-band total source radiance of the target spectral signature 46. Also shown in FIG. 11 are the atmospheric values 52 including spectral transmittance 54 and path radiance 56 within the waveband. The right-hand side of the GUI 70 of FIG. 11 illustrates the target spectral signature 46 after propagation through the atmosphere. The GUI 70 of FIG. 11 optionally indicates the total power of the target spectral signature propagation 48 at the infrared sensor 18 and the total current output from the infrared sensor 18 in the waveband of interest.

Predicted Radiance at Infrared Sensor from Blackbody Calibration Source Spectral Signature:

Propagation of the resolved calibration source spectral signature 62 at the source may be determined by integration using Equation 2 below:

$$\int_{\Delta\lambda}[L_{cal\_bb}(\lambda)*T_{atmos\_10\,m}(\lambda)+L_{foreground\_10\,m}(\lambda)]d\lambda \\ (W/cm^2/sr) \quad (Eqn\ 2)$$

wherein:

$L_{cal\_bb}$=spectral radiance of the blackbody calibration source 60 from Planck equation relating temperature, emissivity and wavelength.

$T_{atmos\_10\,m}$=spectral transmittance 54 from MODTRAN for the blackbody calibration source 60 at an exemplary range of 10 m.

$L_{foreground\_10\,m}$=path radiance 56 between blackbody calibration source 60 and infrared sensor from MODTRAN ($W/cm^2/sr/micron$). For a 10 m range, this term is negligible.

Power on Detector from Point Source:

For applications where the target (e.g., missile, blackbody calibration source) is not resolved (i.e., in a point source case), the background path radiance may be used in Equation 3 below in order to account for the infrared sensor 18 imaging beyond the target:

$$\Phi point=\Phi scene+[Ao*Kd/R^2]*\int At*[Lt(\lambda)*Ta(\lambda)+Lfg \\ (\lambda)-Lbg(\lambda)]*To(\lambda)d\lambda(W) \quad (Eqn\ 3)$$

wherein:

$\Phi scene=[\pi/(4*F/\#^2+1)]*Ad\int Lscene(\lambda)*To(\lambda)d\lambda(W)$ $\Phi scene$=power (watts) on the infrared detector from extended scene radiance $\Phi ext=[\pi/(4*F/\#^2+1)]*Ad\ \int[Lt(\lambda)*Ta(\lambda)+Lfg(\lambda)]*To(\lambda) d\lambda(W)$ $\Phi ext$=power (watts) on the infrared detector from extended source Do=diameter of entrance aperture of infrared sensor F/#=Focal Length/Do R=range (i.e., distance) to target from infrared sensor Ad=area of detector elements 30

At=area of target

Ao=aperture area of optical system 26

Kd=encircled fraction of target spot energy on detector element

To=spectral transmittance 54 of optical system 26 of infrared sensor

Ta=MODTRAN spectral transmittance 54 of atmospheric path

Lfg=MODTRAN spectral radiance of foreground atmospheric path

Lbg=MODTRAN spectral radiance of background atmospheric path

Lt=radiance of target spectral signature

Lscene=MODTRAN spectral radiance of extended scene (e.g., to space)

Lbg=Lscene−Lfg

Figure 12:
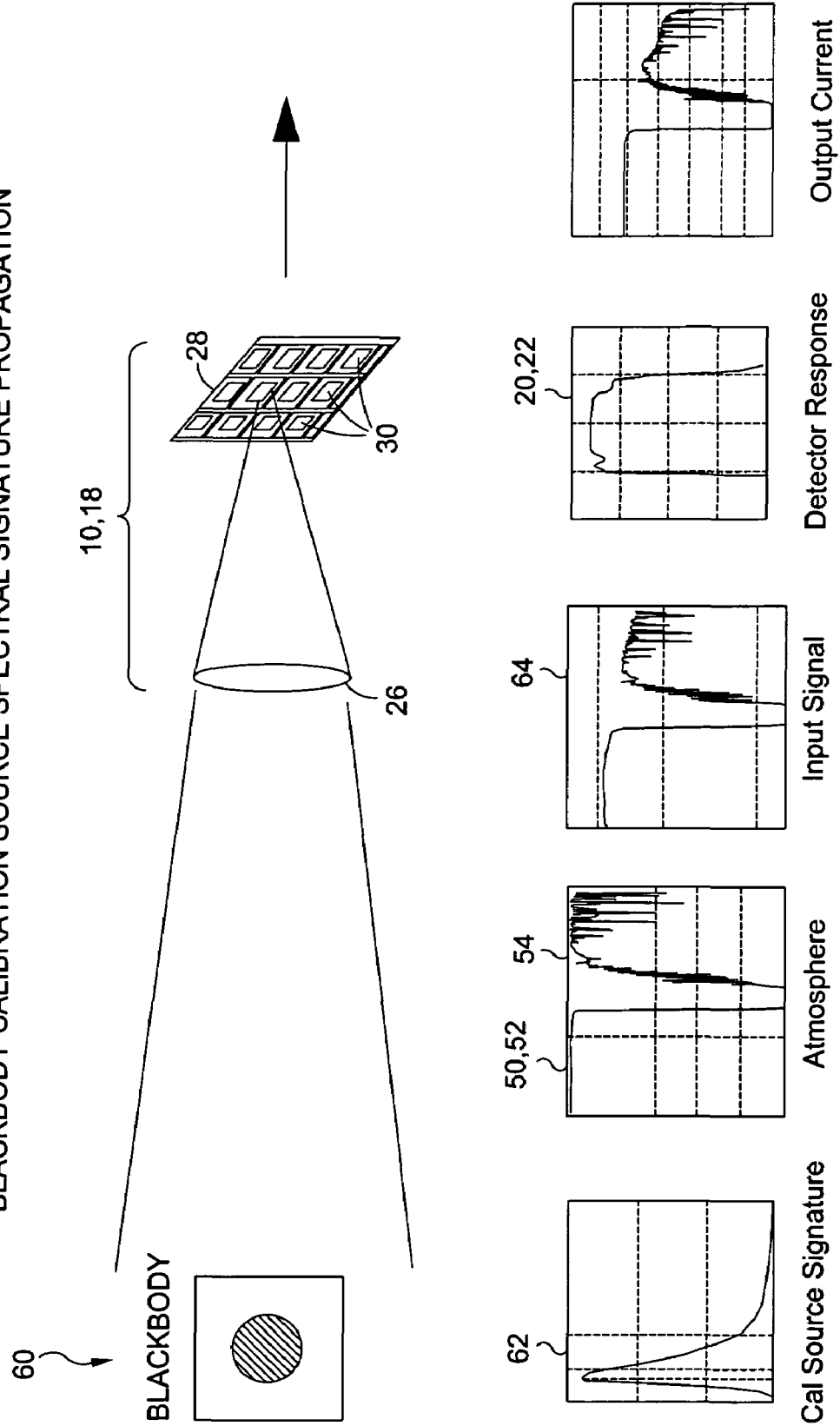
FIG. 12 is a schematic illustration of the calibration source spectral signature propagation at the infrared sensor.

FIG. 12 is a schematic illustration of the sequence by which the blackbody calibration source spectral signature 62 is propagated at the infrared sensor 18 to factor in contributions of path radiance 56 and spectral transmittance 54 of the atmosphere. As described above, the optical system 26 focuses the calibration source spectral signature 62 on the detector elements 30 each having a sensor spectral responsivity 22 as described above. FIG. 12 illustrates the output current signal from the infrared sensor 18 in response to the calibration source spectral signature 62 and plotted as a function of wavelength.

Figure 13:
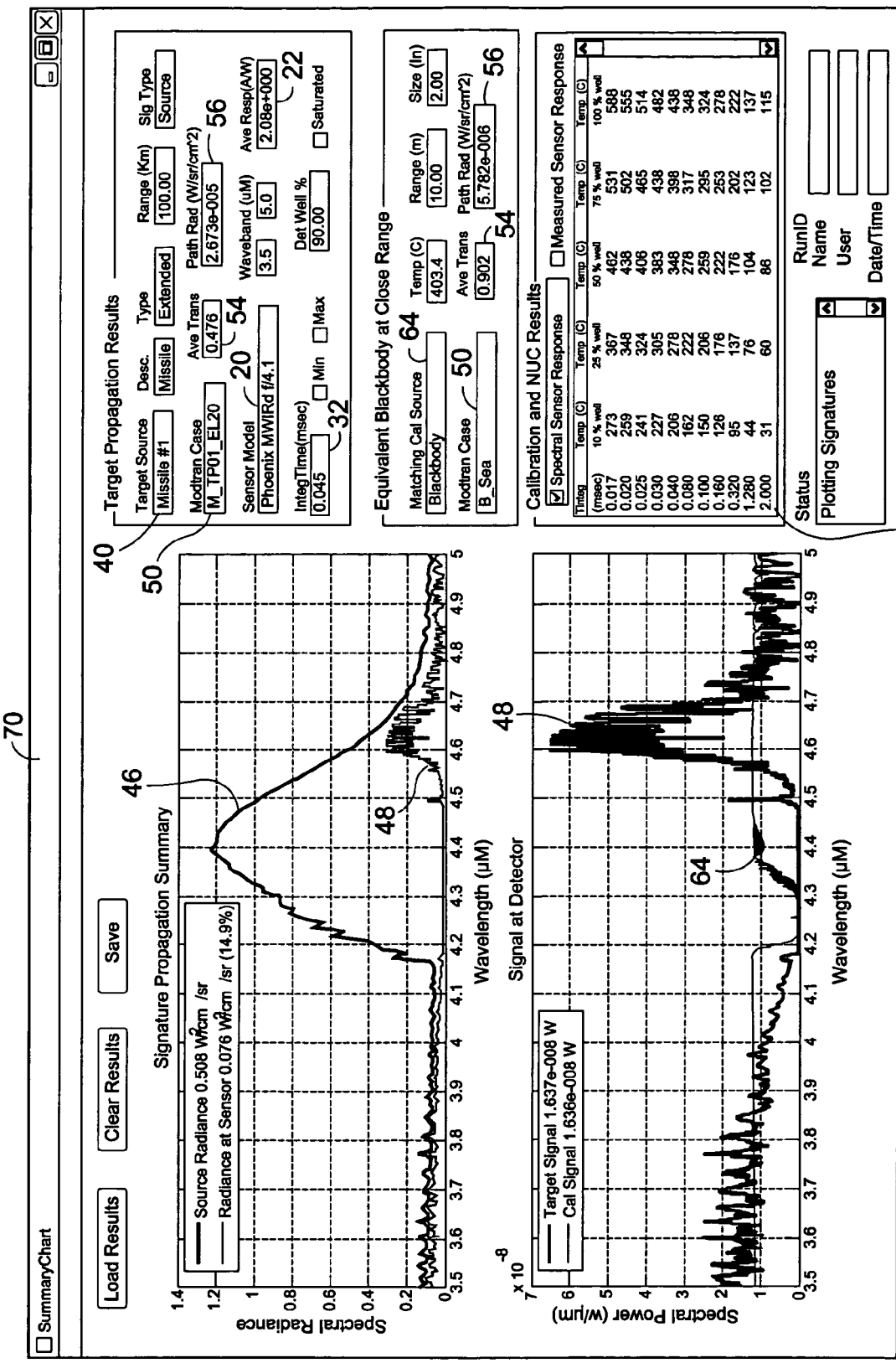
FIG. 13 is an illustration of an example of a GUI of the target spectral signature at the target in comparison to the target spectral signature propagation at the infrared sensor and a comparison of the target spectral signature propagation with the calibration source spectral signature propagation and also illustrating the target spectral signature propagation results, the equivalent blackbody temperature at close range results, and the calibration temperatures and integration time results.

Referring to FIG. 13, shown is a summary chart at the upper left-hand side of the GUI 70 which compares the target spectral signature 46 radiance at the target 40 to the radiance of the target spectral signature propagation 48 at the infrared sensor 18. As can be seen in the example, due to atmospheric contribution, a fraction of the target spectral signature 46 arrives at the infrared sensor. FIG. 13 further graphically illustrates the target spectral signature propagation 48 matched in spectral power to the calibration source spectral signature propagation 64. The effects of the $CO_2$ absorption notch at 4.2-4.4 microns can be seen in the calibration source spectral signature 62.

FIG. 13 further graphically illustrates at the lower left-hand side the matching of the target spectral signature propagation 48 with the calibration source spectral signature propagation 64 in order to determine the blackbody calibration source temperature 78. The matching process comprises comparing Equation 1 with Equation 2 to determine the blackbody calibration source temperature 78 which may be determined at a desired accuracy such as to the $2^{nd}$ or $3^{rd}$ digit.

Figure 14:
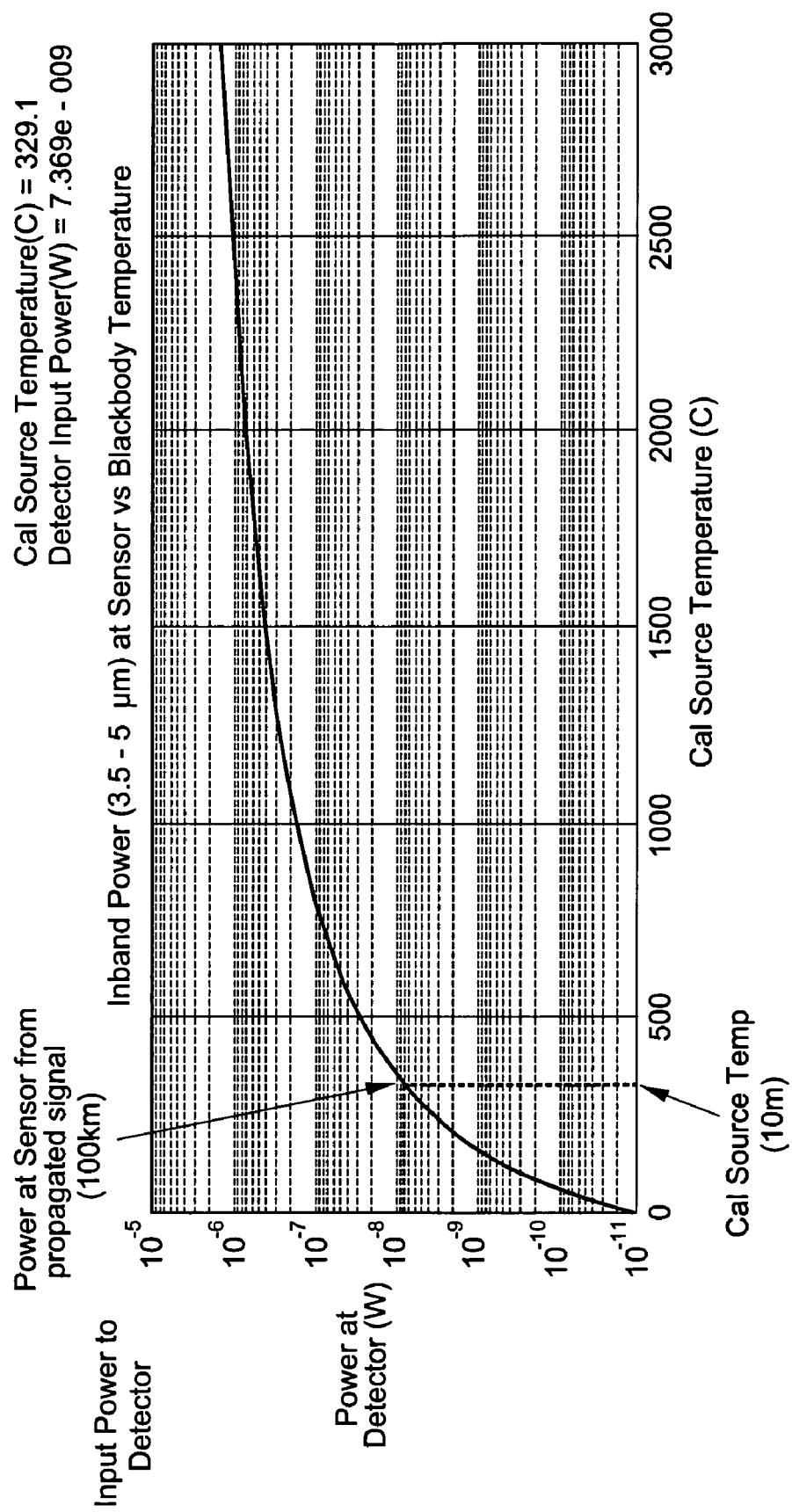
FIG. 14 is a graph of power at the infrared sensor vs. blackbody calibration source temperature for radiometric calibration of the infrared sensor.

FIG. 14 represents a graphical solution for determining the calibration source temperature where Equation 1 is matched to Equation 2. FIG. 14 plots power (watts) from the propagated spectral signature at the infrared sensor vs. blackbody calibration source temperature 78. For example, FIG. 14 illustrates that for an input power of 7.369e-009 watts of the target spectral signature propagation 48 at 100 km, the blackbody calibration source temperature 78 of the blackbody calibration source 60 at 10 meters is 329.1 C. An output current response of the infrared sensor 18 can be generated based on the input power.

Figure 15:
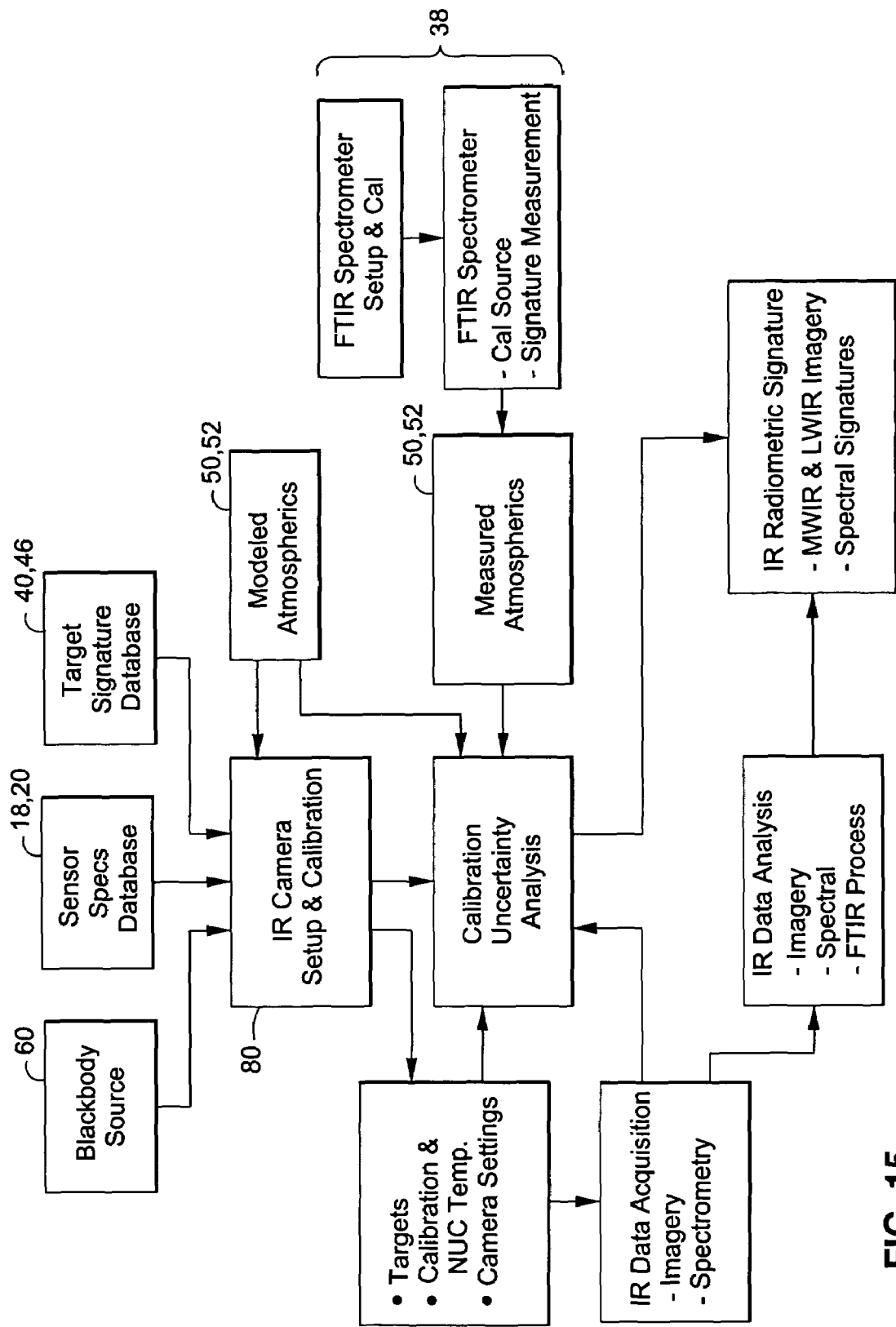
FIG. 15 is a block diagram of the infrared imaging system including infrared sensor calibration and calibration uncertainty analysis.

FIG. 15 is a block diagram of the capabilities of the infrared imaging system 10 in an exemplary embodiment and including infrared sensor 18 calibration and a calibration uncertainty analysis as a function of errors in the sensor model, errors in the atmospheric model 50 such as in the spectral transmittance 54, errors in the Planck blackbody calibration curve, and accounting for the $CO_2$ absorption notch at 4.2-4.4 microns.

Figure 16:
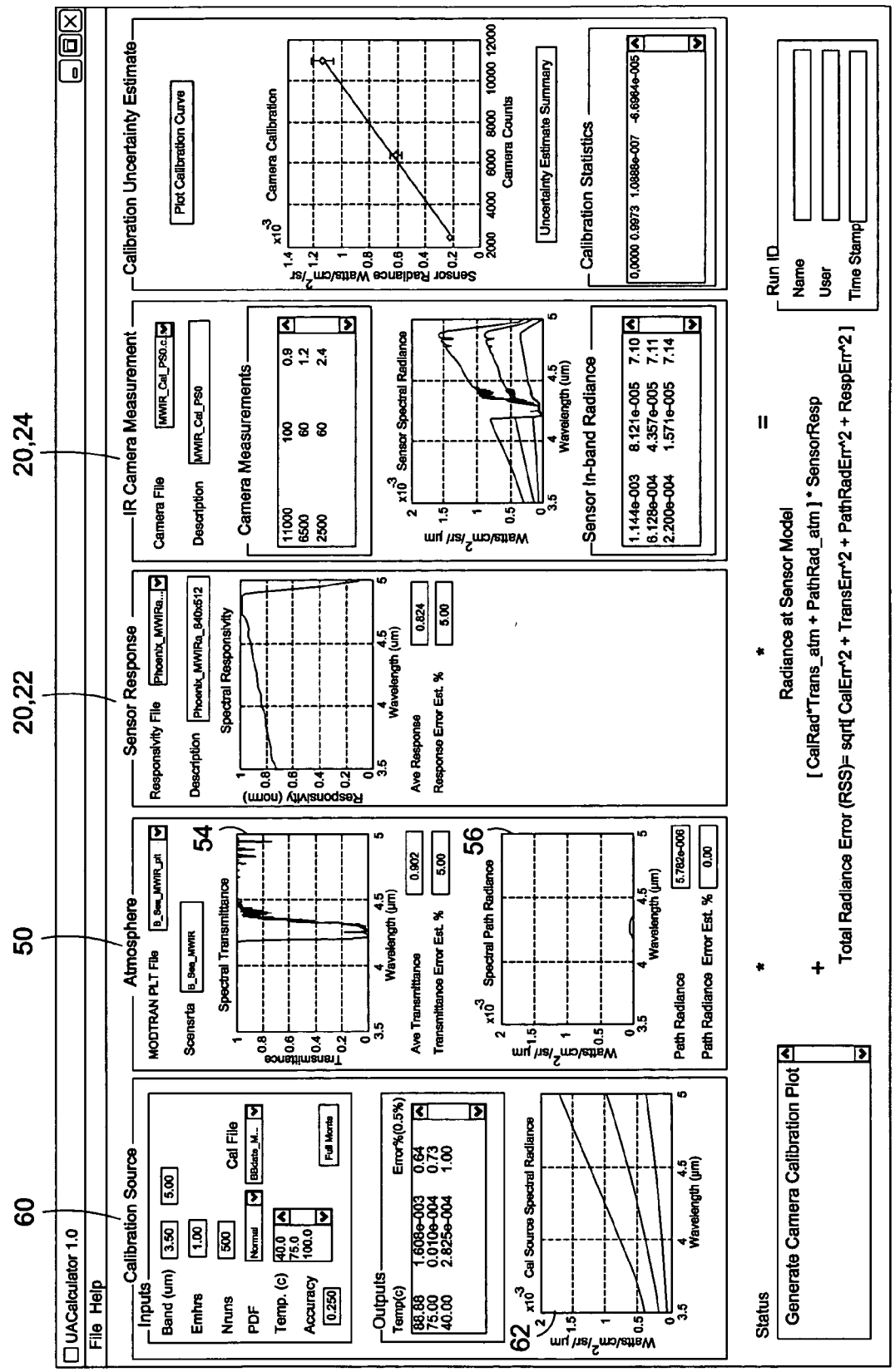
FIG. 16 is an illustration of an example of a GUI of the calibration source spectral signature, the atmospheric model, the sensor spectral responsivity, the infrared sensor measurements for use in outputting a calibration uncertainty estimate.
Figure 17:
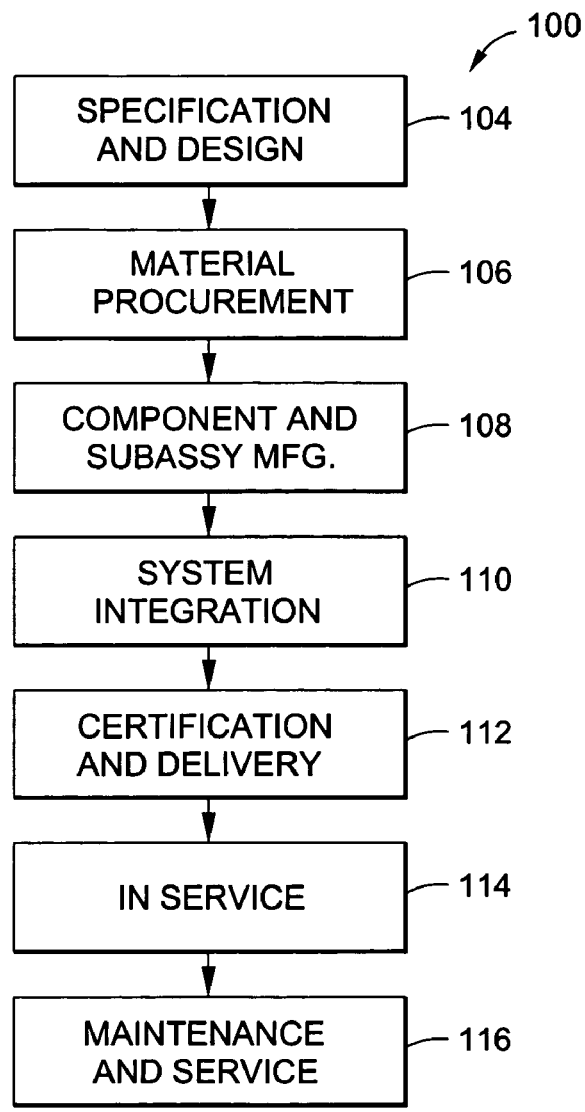
FIG. 17 is a flow diagram illustrating an aircraft production and service methodology.
Figure 18:
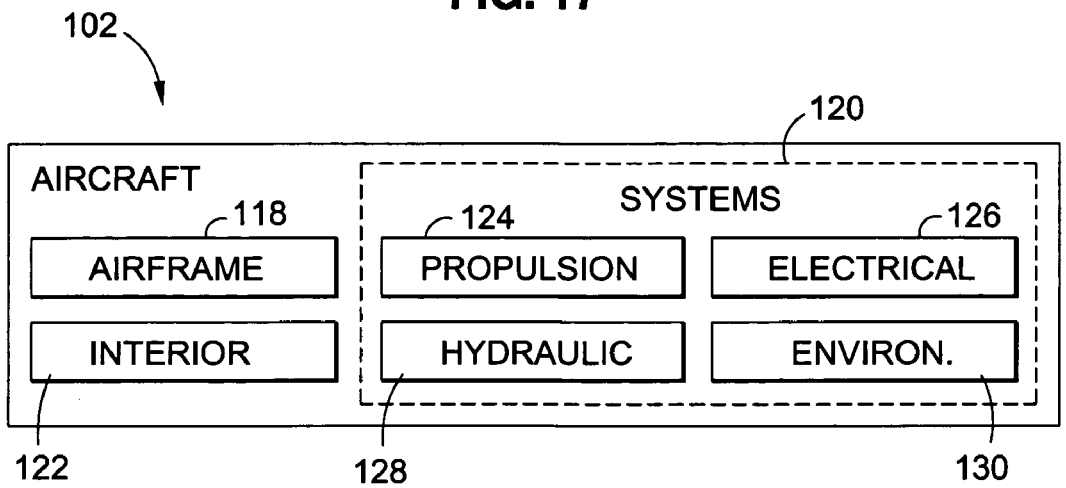
FIG. 18 is a block diagram of an aircraft.

FIG. 16 is an illustration of an exemplary GUI 70 as may be used in presenting results of the uncertainty analysis. The GUI 70 of FIG. 16 illustrates the combining of errors for the calibration source spectral signature 62, the atmospheric model 50, the sensor spectral responsivity 22 and the infrared sensor 18 measurements in order to generate the calibration uncertainty estimate summary in the lower right-hand side of FIG. 16.

In operation and referring to FIG. 3, the calibration system 80 may be used to calibrate the infrared sensor 18 at close range for long range target 40 measurement by initially inputting the infrared sensor model 20 into a computer 68 in step 82. In step 84, the optical system 26 and focal plane 28 parameters of the detector elements 30 may also be input into the computer 68. In step 86, the target spectral signature 46 at the target (i.e., 0 range) may optionally be selected from a database and entered into the computer 68. In step 88, atmospheric values 52 may be inputted in the computer 68 and may comprise path radiance 56 and spectral transmittance 54 provided by an executable program for atmospheric models 50 (e.g., MODTRAN) or the atmospheric values 52 may be derived from atmospheric transmittance derivation calculations without MODTRAN.

Step 90 may comprise predicting the target spectral signature propagation 48 at the infrared sensor 18 based on the inband integration of radiance thereof according to Equation 1 as described above. Step 92 may comprise predicting the calibration source spectral signature propagation 64 at the infrared sensor 18 and matching the target spectral signature propagation 48 with the integrated radiance of the calibration source spectral signature propagation 64 in step 94 in order to determine the blackbody calibration source temperature 78 for radiometric calibration of the infrared sensor 18 in step 96.

Step 98 may further comprise outputting the sensor sensitivity settings which may include the integration time periods 32 of the detector elements 30. Step 98 may also comprise outputting the calibration temperature for non-uniformity correction of the detector elements 30. The calibration system may also facilitate a determination of the spectral signature of a long-range simulated blackbody target propagated to the infrared sensor 18 from the same distance as a target 40 (e.g., missile, aircraft) whose temperatures may be unknown. The infrared sensor 18 can then be calibrated to image the target 40 with a reduced risk of saturation. The above-described processes may be implemented on a computer program product 72 comprising a computer readable medium 74 including a computer readable program 76.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A calibration system for an infrared imaging system including an infrared sensor having a sensor model for imaging a target having a target spectral signature, the infrared imaging system including an atmospheric model having atmospheric values, the calibration system comprising:
   a blackbody calibration source having a calibration source spectral signature; and
   a computer for receiving the sensor model, the target spectral signature, the calibration source spectral signature and the atmospheric values and performing the following operations:
   predicting a target spectral signature propagation at the infrared sensor;
   matching the target spectral signature propagation with the calibration source spectral signature propagation; and
   determining a blackbody calibration source temperature for radiometric calibration of the infrared sensor.

2. The calibration system of claim 1 wherein:
   the atmospheric values comprise at least one of spectral transmittance and path radiance.

3. The calibration system of claim 1 wherein:
   the atmospheric values are derived from atmospheric transmittance calculations.

4. The calibration system of claim 1 wherein the sensor model comprises at least one of the following:
   sensor spectral responsivity;
   measured system response.

5. The calibration system of claim 1 wherein:
   the infrared sensor has at least one of an optical system and a focal plane and corresponding settings thereof;

the computer being operative to determine the optical system and focal plane settings for imaging of the target.

6. A calibration system for an infrared imaging system including an infrared sensor having detector elements and a sensor model for imaging a target having a target spectral signature, the infrared imaging system including an atmospheric model having atmospheric values, the calibration system comprising:
 a blackbody calibration source having a calibration source spectral signature; and
 a computer for receiving the sensor model, the target spectral signature, the calibration source spectral signature and the atmospheric values and performing the following operations:
  predicting a target spectral signature propagation at the infrared sensor;
  measuring a calibration source spectral signature propagation at the infrared sensor;
  matching the target spectral signature propagation with the calibration source spectral signature propagation; and
  determining a blackbody calibration source temperature at which the radiance of the target spectral signature propagation matches the radiance of the calibration source spectral signature propagation; and
  outputting at least one of the following:
   sensor sensitivity settings comprising a plurality of integration time periods of the detector elements; and
   calibration temperature for non-uniformity correction of the detector elements.

7. The calibration system of claim 6 wherein:
 the computer is operative to generate a table comprising a calibration temperature and a non-uniformity correction temperature for each integration time period.

8. The calibration system of claim 6 wherein:
 the atmospheric values are derived from atmospheric transmittance calculations.

9. The calibration system of claim 6 wherein the sensor model comprises at least one of the following:
 sensor spectral responsivity;
 measured system response.

10. A method of calibrating an infrared imaging system having an infrared sensor, comprising the steps of:
 inputting a sensor model, a target spectral signature, a calibration source spectral signature and atmospheric values into a computer;
 predicting a target spectral signature propagation at the infrared sensor;
 matching the target spectral signature propagation with the calibration source spectral signature propagation; and
 determining a blackbody calibration source temperature for radiometric calibration of the infrared sensor.

11. The method of claim 10 wherein the step of determining the blackbody calibration source temperature comprises:
 determining the blackbody calibration source temperature at which the radiance of the target at the infrared sensor matches the radiance of the blackbody calibration source at the infrared sensor.

12. The method of claim 10 wherein the atmospheric values comprise at least one of spectral transmittance and path radiance.

13. The method of claim 10 wherein the infrared sensor includes an optical system, the method further comprising the step of:
 determining optical system settings.

14. The method of claim 10 wherein the infrared sensor includes a focal plane of detector elements, the method further comprising the step of:
 determining sensor sensitivity settings comprising integration time periods of the detector elements.

15. The method of claim 10 wherein the infrared sensor includes a focal plane of detector elements, the method further comprising the step of:
 determining a calibration temperature for non-uniformity correction of the detector elements.

16. The method of claim 10 wherein the step of providing a sensor model comprises at least one of the following:
 inputting values of sensor spectral responsivity;
 developing a sensor spectral response of the infrared sensor using at least one blackbody calibration source.

17. The method of claim 10 wherein the step of providing atmospheric values comprises at least one of the following:
 specifying spectral transmittance; and
 specifying path radiance.

18. The method of claim 10 wherein the step of providing atmospheric values comprises at least one of the following:
 inputting atmospheric values from the atmospheric model; and
 deriving atmospheric values from atmospheric transmittance calculations.

19. A method of calibrating an infrared imaging system having an infrared sensor, comprising the steps of:
 inputting into a computer a sensor model, a target spectral signature, a calibration source spectral signature, atmospheric values comprising at least one of spectral transmittance and path radiance;
 predicting a target spectral signature propagation at the infrared sensor;
 matching the target spectral signature propagation with the calibration source spectral signature propagation;
 determining the blackbody calibration source temperature at which an integrated band radiance of the target spectral signature at the infrared sensor matches the integrated band radiance of the calibration source spectral signature at the infrared sensor;
 determining optical system settings; and
 determining sensor sensitivity settings comprising integration time periods of the detector elements.

20. A computer program product comprising a computer readable medium including a computer readable program, wherein the computer readable program, when executed on a computer, causes the computer to:
 input a sensor model of an infrared sensor, a target spectral signature from a target, a calibration source spectral signature from a blackbody calibration source, and atmospheric values from an atmospheric model;
 predict a target spectral signature propagation by performing a band integration of radiance of the target spectral signature at the infrared sensor;
 predict a calibration source spectral signature propagation by performing a band integration of radiance of the calibration source spectral signature at the infrared sensor;
 match the target spectral signature propagation with the calibration source spectral signature propagation; and
 determine a blackbody calibration source temperature for radiometric calibration of the infrared sensor.

21. The computer program product of claim 20 wherein the infrared sensor has detector elements, the computer readable program causing the computer to:
 determine sensor sensitivity settings comprising integration time periods of the detector elements.

22. The computer program product of claim 20 wherein the infrared sensor has detector elements, the computer readable program causing the computer to:
    determine a calibration temperature for non-uniformity correction of the detector elements.

23. The computer program product of claim 20 wherein the computer readable program causes the computer to: include spectral transmittance and path radiance contributions of the atmospheric values in the integrations of radiance of the target spectral signature and the calibration source spectral signature.

\* \* \* \* \*